United States Patent [19]

Decaesteke et al.

[11] Patent Number: 5,448,286

[45] Date of Patent: Sep. 5, 1995

[54] PROCESS AND TERMINAL FOR VIDEO TELEPHONY PERMITTING ACCEPTANCE, AND POSSIBLY CALLING, BY A TELEPHONE SET

[75] Inventors: Philippe Decaesteke; Jean-Marc Marczak, both of Bois D'Arcy; Jacques Guichard, Issy les Moulineaux, all of France

[73] Assignees: Matra Communication, Quimper; France Telecom, Paris, both of France

[21] Appl. No.: 184,190

[22] Filed: Jan. 18, 1994

[30] Foreign Application Priority Data

Jan. 15, 1993 [FR] France ................. 93 00363

[51] Int. Cl.[6] ........................................ H04M 11/00
[52] U.S. Cl. ................................ 348/17; 379/94; 370/110.1
[58] Field of Search ........... 379/93, 94, 96–98; 370/62, 110.1; 348/14, 16, 17

[56] References Cited

U.S. PATENT DOCUMENTS 5,371,534 12/1994 Dagdeviren et al. ............. 348/17

FOREIGN PATENT DOCUMENTS 119588 3/1984 European Pat. Off. .
374949 12/1989 European Pat. Off. .

OTHER PUBLICATIONS

IEEE Transactions On Consumer Electronics, vol. 36, No. 3, Aug. '90 New York, U.S. pp. 753–757—T. Naganawa et al. "A study of Audio communication Devices for ISDN"—p. 754, right col. alinea 3–4; left col. alinea 4; FIG. 3—p. 757, lef col., alinea 2–3; FIG. 11.

International Switching Symposium 1987, Session A11, Paper 6, vol. 4/4 Mar. 20, '87, Phoenix, Ariz., U.S.—pp. 875–879—P. Lyhne et al "ISDN-A Basis for Enhanced And New Services For The Next Decades" p. 5, left column; FIG. 4.

*Primary Examiner*—Wing F. Chan
*Attorney, Agent, or Firm*—Larson and Taylor

[57] ABSTRACT

In order to establish a videophone communication from a calling terminal to a called terminal, a communication is established on a first TBCC channel, then a ringing tone is emitted automatically, from the called terminal, to the calling terminal on the first channel and a call is emitted to the telephone set on the second channel B; in response to the unhooking of the telephone handset the two channels are automatically linked from the called terminal; and, in response to a code from the telephone set, the emission is caused of a waiting tone to the calling terminal and a ringing to the called videophone terminal; in the event of acceptance on the part of the subscriber of the called videophone terminal, the establishment of communication is automatically continued in response to the hooking of the set.

5 Claims, 4 Drawing Sheets

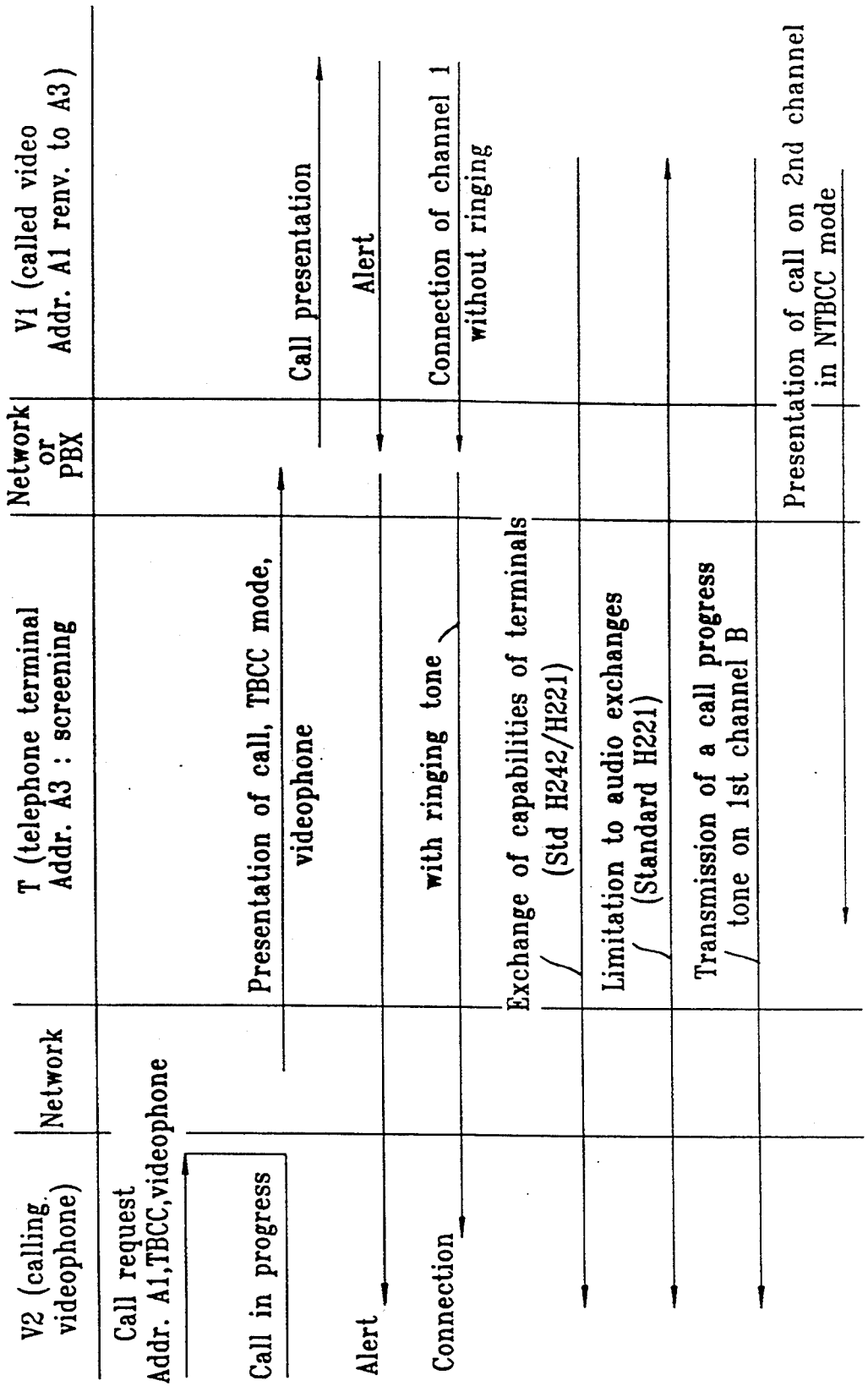

PROCESS AND TERMINAL FOR VIDEO TELEPHONY PERMITTING ACCEPTANCE, AND POSSIBLY CALLING, BY A TELEPHONE SET

TECHNOLOGICAL BACKGROUND

The invention relates to processes for the establishment of a communication using video telephony between a calling terminal and a called terminal via public or private networks, as well as video telephony terminals permitting the implementation of such a process.

It finds a particularly significant application in the telephone installations having at least one videophone screened by an acceptance telephone set, the call from the videophone to a number available to third parties, which will be referred to hereinbelow as "public", giving rise to the direction of the incoming call to the screening telephone set or "screening" set.

The conventional architectures of installation, where the screening set is a telephone and not a videophone, prohibit the establishment of the communication on an incoming call from the network outside the periods in which the screening is eliminated, where the called terminal has a conventional constitution.

A reminder will be given, first of all, of the manner in which a call from a calling videophone to a called videophone is normally established.

The calling subscriber selects the number of his partner and commands the sending of the videophone call message. The calling videophone then attempts to establish a link onto an ISDN network via a first channel B in TBCC (Transparent B Circuit Communication) mode. If the communication is accepted by the destination videophone, a possible second B channel in TBCC mode is established, if the videophones require this. The videophone communication can then take place, for example with utilization of the protocols and especially of the frame H221.

If the first transparent B channel cannot be established, because the destination set is not a videophone terminal but an ordinary telephone set, the calling videophone terminal establishes a nontransparent channel NTBCC and reverts to traditional telephony, after having cleared the first TBCC if it had already been established.

If the called videophone terminal is screened by a telephone set, the calling videophone terminal will not be able to establish a communication of videophone type and will revert to telephone mode.

The Patent Application FR No. 91 10,493 proposes a process permitting this impossibility to be set aside; according to this process, once a telephone communication has been established between the terminals, on an NTBCC channel, a service message is sent from the called terminal, which service message is included in a message to clear the NTBCC line and contains a secret number for (unscreened) direct calling of the called videophone and there is established directly, from the calling terminal, a link on two type B channels by utilizing the unscreened call secret number.

This process gives very good results. However, it demands that not only the called terminal but also the calling terminal be adapted.

SUMMARY OF THE INVENTION

The object of the present invention is especially to provide a process for establishment of videophone communication to a screened videophone set, which is capable of being implemented while demanding only very small additions to the called videophone terminal, authorizing the interception of the communication originating from a conventional calling videophone terminal.

With this object in view, the invention proposes especially a process for establishment of a videophone communication from a calling videophone terminal to a called videophone terminal with two channels B, which is wired through a telephone set. Once a communication on a first TBCC channel has been established with H221 frame without ringing between the calling videophone terminal and the called videophone terminal, a ringing tone is automatically emitted from the called terminal to the calling terminal on the first channel and a call is emitted to the telephone set on the second channel to establish a link between the caller and the telephone set; in response to the unhooking of the telephone handset, the two channels are automatically linked, from the called terminal, to route the communication originating from the calling terminal to the telephone set without breaking the communication on the first TBCC channel; in response to a voice frequency signaling code, which is intentionally emitted from the telephone set, the emission of a waiting tone is caused to the calling videophone terminal and a ringing to the called videophone terminal in order to alert the partner user with a view to the establishment of a connection with the telephone set; in the event of acceptance on the part of the subscriber of the called videophone terminal, the process of establishment of the videophone communication between the videophone terminals is automatically continued, in response to the hooking of the telephone set.

The invention also proposes a videophone terminal permitting the implementation of the above-defined process, with two channels and with direct call number, having means for switching an incoming call on a first channel B to an acceptance telephone set via the second channel B. Various configurations are possible to fulfil the functions mentioned hereinabove. In an embodiment which is advantageous but not exclusive, the terminal further comprises: means capable, in response to the establishment of a link on a first TBCC channel following a call from a calling videophone terminal, of establishing on the second channel a link with the telephone set, and of sending back a ringing tone; a channel switch permitting the placing in connection of the two channels to route the communication from the calling terminal to the telephone set in response to the unhooking of the latter; a receiver for a signaling code, for example of voice frequency, originating from the telephone set, cooperating with the switch to break the communication between the two channels and with the ringing of the called terminal to command the same breaking; and means for the emission, on the first TBCC channel, of a request, intended for the calling terminal, for the establishment of videophone communication.

The process hereinbefore defined above permits the acceptance of a call originating from a calling videophone terminal via an ordinary telephone set, then the transfer of the call to the called terminal without loss or cutting-off of the communication established by a calling videophone terminal. It does not concern the operations effected at the level of the calling terminal and proceeds from the assumption that the call originates from an installation capable of establishing a link on a first channel B with frame H221, then on a second channel.

In the case where the call originates from a videophone terminal, the process according to the invention does not require any modification of the operations to be effected by the calling videophone subscriber. He must himself dial the call number and, if the called videophone terminal is screened, he must dialogue with the user of the screening set prior to obtaining the communication with the partner of his choice, this being a communication which it will not be possible to establish in videophone mode in the case of a conventional screening set.

A further object of the invention is to offer the possibility, to the user of a videophone terminal, of arranging for the call to be made to another terminal from a telephone set, without nevertheless necessitating an appreciable addition of equipment.

With this object in view, the invention proposes especially a process according to which, the calling videophone terminal being intended to manage at least two DSA (Direct Selection on Arrival) numbers, one of which is a first number, for public calling, and the other of which is a second number, reserved for the use of a screening set—a call is emitted, from the screening set, to the calling terminal on the second number in order to establish an NTBCC communication on a first channel B without causing ringing;

on reception, by the screening set, of a tone requesting dialing, the call number of the called videophone terminal is selected from the screening set to cause the emission of a TBCC call with frame H221 by the screened calling terminal to the destination of the remote called videophone terminal on the second channel B;

after establishment of the call, the two channels B are automatically placed in communication at the level of the calling videophone terminal.

The pursuit of the establishment of the link is dependent upon the capacities and upon the circuitry of the called videophone terminal. At its level, the procedure is conventional to the extent that the called videophone terminal is not screened. If it is screened in a conventional manner by a telephone set, there is reversion to telephone mode. If the called terminal is screened by a set but is intended to implement the acceptance process mentioned hereinabove, the establishment of the videophone link is effected as was indicated in the course of the description of the first aspect of the invention.

It is seen that, when the two aspects of the invention are utilized, the user of a videophone terminal connected to a private automatic branch exchange on an SO-type interface has at his disposal services which are virtually the same as those which are provided by the automatic branch exchange for the telephone sets which are connected to it on a private dedicated interface, capable of accepting links in TBCC mode.

It is likewise found that the implementation of the second aspect essentially demands supplementary software, but demands virtually no complication of the equipment.

The invention will be better understood on reading the description, which follows, of a particular embodiment which is given by way of nonlimiting example. The description refers to the drawings which accompany it.

BRIEF DESCRIPTION OF THE DRAWINGS

FIGS. 2A and 2B show a possible sequence of the operations which take place in the case of a call from the videophone V2 to a screened videophone V1, in accordance with a first aspect of the invention;

DETAILED DESCRIPTION OF EMBODIMENTS

Figure 1:
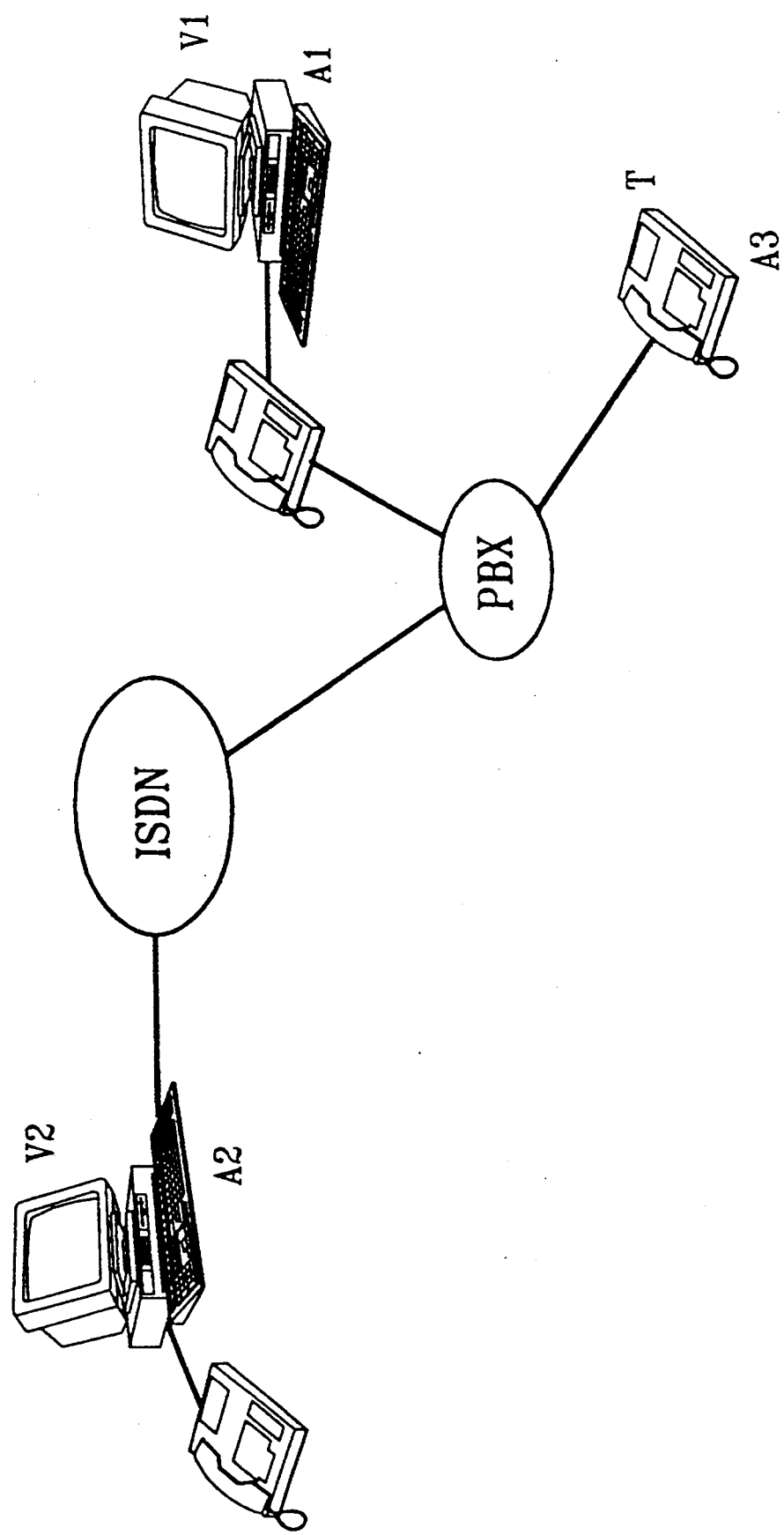
FIG. 1 diagrammatically shows a call routing diagram, from a calling videophone terminal V2 to a called videophone terminal V1, via a private automatic branch exchange PBX.

A first aspect of the invention will be stated in its application to the establishment of a communication from a calling videophone terminal V2 to a videophone terminal V1 screened by a screening telephone set T, via an integrated services digital network ISDN of NUMERIS type and/or a private automatic branch exchange PBX. The called videophone is intended to be able to accept the establishment of communications on two channels B which are framed to the standard CCITT H 221, while the screening telephone set is intended only for a digital or analog telephone service.

A1, A2 and A3 will be used to designate the call numbers of the terminals and sets V1, V2 and T. The invention can be implemented just as well in the case where the terminal V2 is directly connected to the automatic branch exchange PBX as in the case where it gains access thereto via the public network.

FUNCTIONING OF A CONVENTIONAL INSTALLATION

Before stating the invention, a reminder will be given of the succession of the operations which take place in a conventional calling installation of a screened videophone terminal, of address or call number A1, sent back to an address screening set A3.

The subscriber at the call number A2 presses for example the "video telephony" key of his terminal, dials the address A1 of the partner requested and presses the "send" key.

There is then an attempt at connection in videophone mode with the terminal V1. To achieve this, the terminal V2 sends via the network a request for establishment of a link with V1, at the address A1, on a transparent TBCC channel. However, the call fails on account of the incapacity of the set T to process a TBCC call, at the same time as there is a routing tone. Failing a response by the telephone T on account of the lack of establishment of the switching by the PBX, there is, after a time delay and a new call presentation, clearing of the TBCC.

After this sequence, which is terminated by the clearing of the TBCC channel, the videophone V2 can be intended to launch automatically a connection sequence, this time in telephony mode. This sequence includes a request for establishment of a link with the address terminal A1, on a nontransparent NTBCC channel, in telephony. The presentation of the call to the screening telephone set T, at the address A3, is effected in accordance with the customary process and is completed by the acknowledgement of connection (ACK connection). There is then transfer to conversation between the videophone terminal V2 and the screening telephone set T.

Conventionally, the set T can transfer the telephone call to the videophone V2. The sequence up to the transfer to conversation between V1 and V2 is then conventional.

It is found that it is not possible under these conditions to establish a videophone link between the terminals V1 and V2.

PROCESS OF ESTABLISHMENT OF VIDEOPHONE LINK

A description will now be given of a process according to a particular embodiment of the invention permitting the establishment of the videophone communication without any necessity to renounce the screening and with modifications of the called terminal which remain simple, the calling terminal being able on its part to be conventional, Just like the automatic branch exchange PBX. To do this, the invention utilizes the availability, at least at the level of the called terminal, of two channels B to which it is sufficient to add, in the terminal V1, capabilities of switching of these channels, of generation of signals at voice frequency and of reception/decoding of such signals. The receiving means must be adapted to a corresponding generator which is provided in the screening set: at the present time, the telephone sets intended to be connected to PBXs exhibit, except for models which are very much at the bottom of the range, the required functional capabilities (generator with pairs of voice frequencies).

Figure 2B:
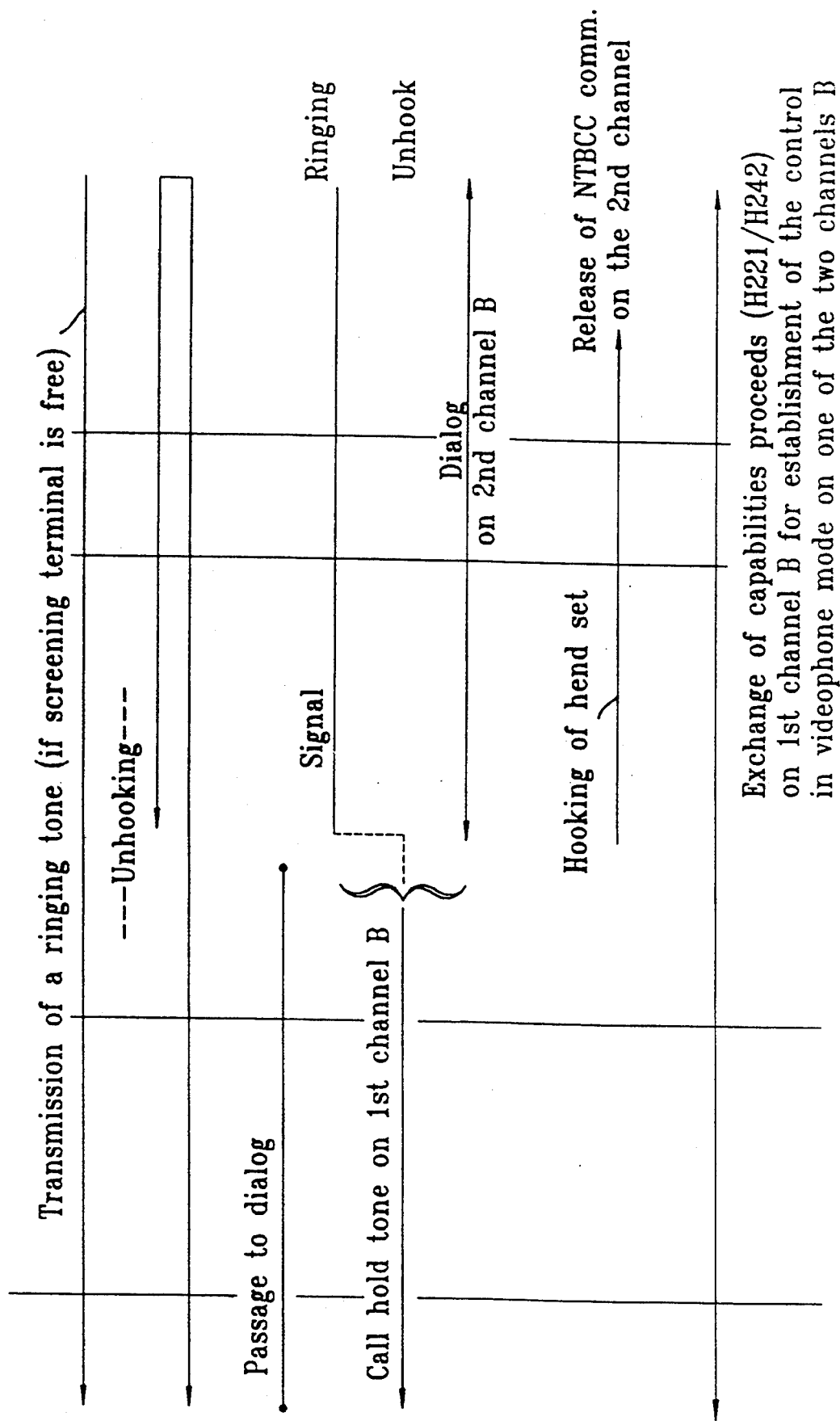

The initial part of the sequence is the same as in the case of establishment of a link between unscreened videophones (FIG. 2). The subscriber at the call number A2 (videophone terminal V2) makes a request for establishment of a link with the terminal V1. A TBCC call is emitted by V2 on its first channel B. Generally, the videophone V1 will be equipped with a selector equipped with a condition indicator permitting the user to make it operate either in conventional manner in unscreened mode, or in mode screened by the telephone set T. Only this second mode will now be stated. V1 automatically establishes a communication with V2 on this first channel B, in TBCC mode, but this time without there being any ringing and without there being any intervention by the subscriber at the terminal V1. The protocols H 221 and H 242 are implemented on this first channel B in order to establish a phonic communication.

At the same time, means provided in the terminal V1, which means may be constituted by a programmed microprocessor likewise performing other functions, negotiate the establishment of a communication of single channel sound type, in accordance for example with the standard G 711 in NTBCC mode on its second channel B, with the telephone T. On the first channel B, when established, V1 emits to V2 a routing tone, for as long as the set T has not rung. From the ringing of the set T, V1 sends back to V2 a ringing tone.

V1 maintains on the second channel B a call to the destination of the screening telephone set T until the unhooking of the set T or indeed until abandonment of the call by the terminal V2.

The unhooking of T automatically places the two channels B in connection at the level of V1, in such a manner as to route the communication via the first channel B between V2 and V1, and via the second channel B between V1 and T. The subscriber at the telephone set T can then accept V2 and, for example, verify that the subscriber at the terminal V2 desires a communication in video telephony with V1.

The subscriber of the telephone set T then dials on his keyboard a predetermined signaling code which is emitted in voice frequencies to the terminal V1.

In the course of the detection and of the identification of this code, the terminal V1 breaks the communication between its two channels B and emits to V2 a waiting or hold tone.

The placing in mutual connection of the two channels and the breakage of this linkage simply demand the addition, to the terminal V1, of a channel switch and of means for commanding this switch from the programmed microprocessor. The microprocessor can execute the functions of identification of the signaling code.

The microprocessor commands the ringing of the terminal V1 in such a manner as to alert the user of the terminal V1 at the same time as the emission of the waiting tone to V2.

When the subscriber at the terminal V1 unhooks, he is connected to the telephone set T on the second channel, without retransmission to V2. The subscriber of the set T can then offer the call from V2.

If the call is accepted, it is generally sufficient to hook the set T to bring about, on account of the breaking of the second channel, the emission by V1, on its first channel B, for the destination of V2, of a request for establishment of a videophone call, in H 242 signaling, on one or two channels B.

Once the connection has been made, the transfer to video telephony is complete.

If the V1 subscriber refuses the call offered by T, he hooks. The microprocessor is intended to reestablish then the link between the two channels B of V1, i.e. the telephone link between T and V2. The communication will then be broken by hooking of T or of V2.

The process defined hereinabove is capable of being implemented on any videophone terminal capable of establishing communications on two channels B, even where the calling remote terminal is capable only of processing a single TBCC channel. In order to do this, it is necessary to add to a conventional terminal V1, a channel switch permitting the connection of the channels to one another, in such a manner as to route to the associated screening telephone set T, the link established automatically, without intervention by the subscriber, on a single channel with the calling terminal. This switch has the supplementary function of connecting the channels B with tone receivers and generators. The invention can be implanted on a terminal having capabilities of visualization and of transmission, such as a microcomputer equipped with a display screen. The process can likewise be implemented not directly in the videophone terminal, but in an external microexchange or automatic branch exchange.

The entirety of the command functions can be executed by a multitasking software loaded in the memory of a computer unit which may be a microprocessor executing also the conventional functions in a terminal.

PROCESS OF ESTABLISHMENT OF A VIDEOPHONE LINK FROM A CALLING SCREENED TERMINAL

A description will now be given of a process permitting the establishment of videophone communication by the user of a screening set, at the request of the user of the calling terminal. V'1 will be used to designate the calling terminal, T' the screening set, and V'2 the remote called videophone terminal.

The process utilizes the same capabilities of the calling videophone terminal V'1 as those required for the implementation of the process which has just been described, authorizing the establishment of a videophone link when the called terminal is screened. These capabilities are especially the following:

independent and coordinated management of two channels B (of 64 kb/s) of an S0 interface of an ISDN network, management of the frame H 221 of the channels B and of the H 242 signaling, capability of switching of the two channels B between them or to band signaling generators/receivers, tone generator, receiver of voice frequency codes, referred to as DTMF.

The implementation of the process further requires that the calling terminal V'1 shall be capable of generating at least two SDA numbers of one and the same S0 interface, the first SDA number being allocated to the public call number of the terminal V'1 while the second number is reserved for the use of the set T' screening the outgoing calls.

The principle consists in causing the videophone call to be established by the terminal V'1 itself, by remotely commanding it from the screening telephone set T'.

The software implanted in the terminal V'1 is then intended to permit the remote commanding of V'1 on one channel B, from the screening set T', on call on the second number of the terminal.

A communication in NTBCC mode is thus realized on this first channel B. The second channel B is utilized by the automatic call establishment system, implanted in the software of the terminal V'1, to call the remote videophone V'2 in TBCC mode framed H221.

Figure 3:
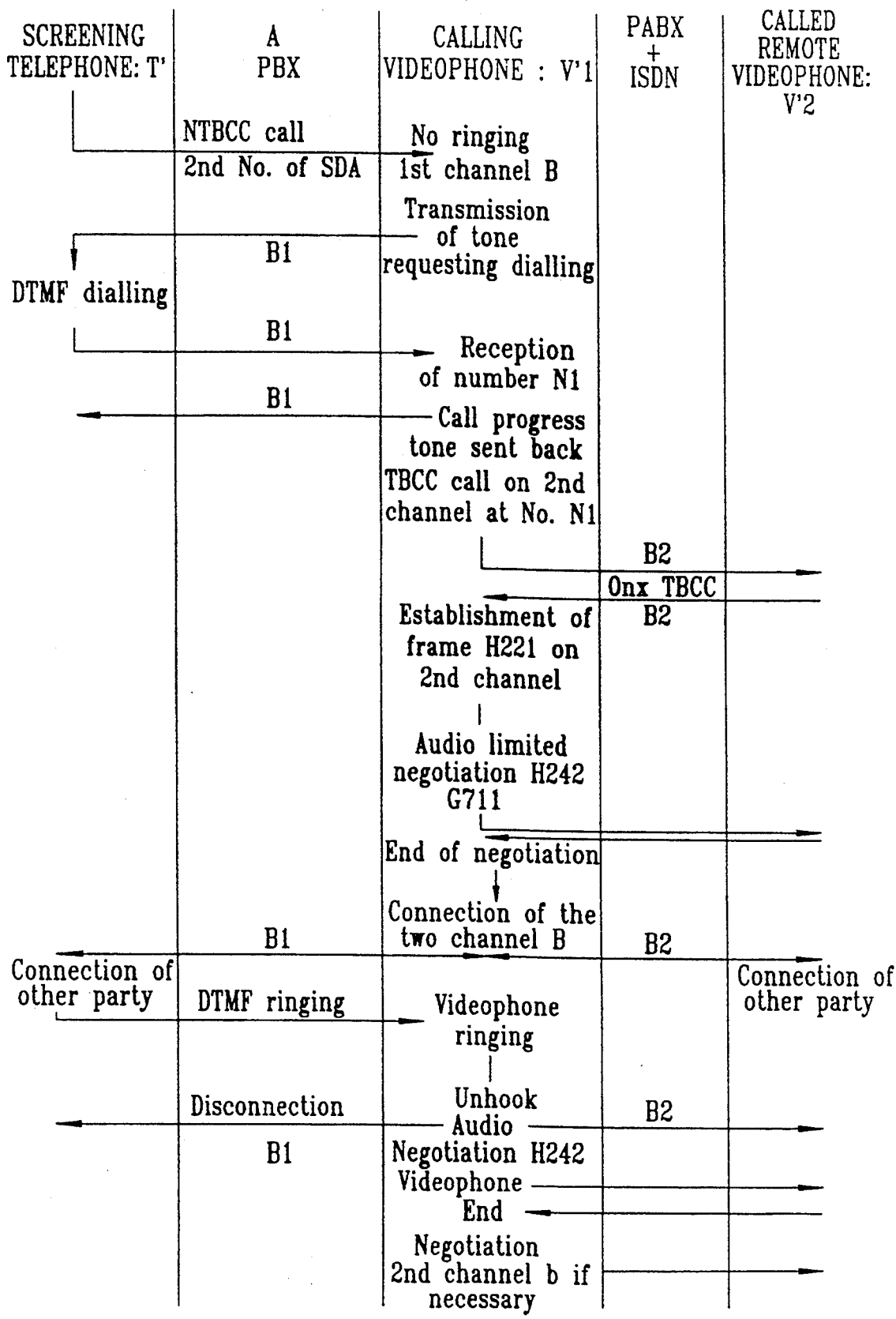
FIG. 3 shows a possible sequence of operations which take place in the case of a call from a screened videophone V'1 to another videophone, in accordance with another aspect of the invention.

The sequence of the operations which take place at the level of the calling terminal V'1 of the screening telephone set T' appears in FIG. 3.

The user of the calling terminal V'1 calls the screening set T' and requests the placing in videophone communication with a partner V'2, and then he hooks.

The user of the set T' then calls the local videophone terminal V'1 on the second SDA number to establish a NTBCC communication on the first channel B1 of the terminal V'1, without there having been any ringing of the terminal V'1 or action by the user of this terminal.

The terminal V'1 then emits on the channel B1 a tone requesting dialing.

In response, the user of the set T dials on his keyboard, in voice frequencies or DTMF, the call number of the desired partner, that is to say of the remote terminal V'2. Upon reception of this dialing, V'1 emits to T', on the channel B1, a routing tone. Further, at the same time it emits a TBCC call with destination V'2 on its channel B2.

It will first of all be assumed that the call is established directly with an unscreened videophone set. In this case, the set V'1 realizes the frame H221 of the channel B2 and negotiates, with the remote terminal V'2, a communication of the audio type G711 in law A.

Immediately afterwards, V'1 places its two channels B in mutual communication, in order to permit the user of the screening telephone set T' to offer to the user of the called remote terminal V'2 the transfer of the call to the user of V'1.

If the call is accepted, the user of the set T' then emits, again in DTMF, a signaling to V'1 to cause the ringing of the videophone V'1.

Upon the unhooking by the user of the terminal V'1, this terminal V'1 breaks the communication on the channels B1, thus placing the users of the two terminals in phonic connection.

The terminal V'1 then automatically negotiates, in H242, the end of the establishment of the videophone communication on one or two channels B, according to a process which is traditional.

If the called terminal is screened by a telephone set and is intended to permit the acceptance of a videophone call, the process is that defined hereinabove.

We claim:

1. Process for the establishment of a videophone communication from a calling videophone terminal to a called videophone terminal with B-channels, which is screened by a telephone set, comprising the following steps:

a communication is established on a first transparent B circuit communication (TBCC) B-channel between a calling videophone terminal and a called videophone terminal;

a ringing tone is automatically emitted from the called videophone terminal to the calling videophone terminal on the first TBCC B-channel and a call is emitted to the telephone set on a second TBCC B-channel to establish a link between the calling videophone terminal and the telephone set;

in response to the unhooking of the telephone handset, the two TBCC B-channels are automatically linked from the called videophone terminal, to route the communication originating from the calling videophone terminal to the telephone set without breaking the communication on the first TBCC B-channel;

in response to a voice frequency signaling code, which is intentionally emitted from the telephone set, the emission of a waiting tone is sent to the calling videophone terminal and a ringing tone is sent to the called videophone terminal in order to alert the partner user with a view to the establishment of a connection with the telephone set; and in the event of acceptance on the part of the subscriber of the called videophone terminal, the process of establishment of the videophone communication between the calling and called videophone terminals is automatically continued in response to the hooking of the telephone set.

2. Videophone terminal with two B-channels for the implementation of the process according to claim 1, having a direct call number and means for switching an incoming to the telephone set, further comprising:

means capable, in response to the establishment of a link on the first TBCC B-channel following a call from the calling videophone terminal, of establishing on the second TBCC B-channel a link with the telephone set and of sending back a ringing tone;

a channel switch permitting placing in connection of the two TBCC B-channels to route the communication from the calling videophone terminal to the telephone set in response to the unhooking of the latter;

a receiver for a signaling code originating from the telephone set, cooperating with the switch to break the communication between the two TBCC B- channels and with the ringing of the called videophone terminal; and means for the emission, on the first TBCC B-channel, of a request, intended for the calling videophone terminal, for the establishment of a videophone communication.

3. Process according to claim 1, characterized in that, to make a call from a videophone terminal associated with and screened by a telephone set, the videophone call is established by the screened calling videophone terminal itself, commanding it remotely from the screening telephone set.

4. Process according to claim 3 for the reception of a video call from the screened calling videophone terminal intended to manage at least two direct selection on arrival numbers, one of which is a first number, for public calling, and the other of which is a second number, reserved for the user of the screening telephone set, comprising the following steps:

a call is emitted from the screening telephone set which screens said calling videophone terminal, to the calling videophone terminal on the second number in order to establish a nontransparent B circuit communication (NTBCC) communication on a first B-channel without causing ringing;

on reception, by the screening telephone set, of a tone requesting dialing, the call number of the called videophone terminal is selected from the screening telephone set to cause the emission of a TBCC call by the screened calling videophone terminal to the destination of a remote called videophone terminal on the second B-channel;

after establishment of the videophone call, the two B-channels are automatically placed in communication at the level of the screened calling videophone terminal.

5. Process according to claim 4, characterized in that after the two B-channels are placed in communication, the user of the screening telephone set, once he has obtained approval from the user of the called videophone terminal, emits a signal from the screening telephone set causing ringing of the screened calling videophone terminal and unhooking of the screened calling videophone terminal causes the breaking of communication between the screened calling videophone terminal and the screening telephone set.

* * * * *